Figure 14:
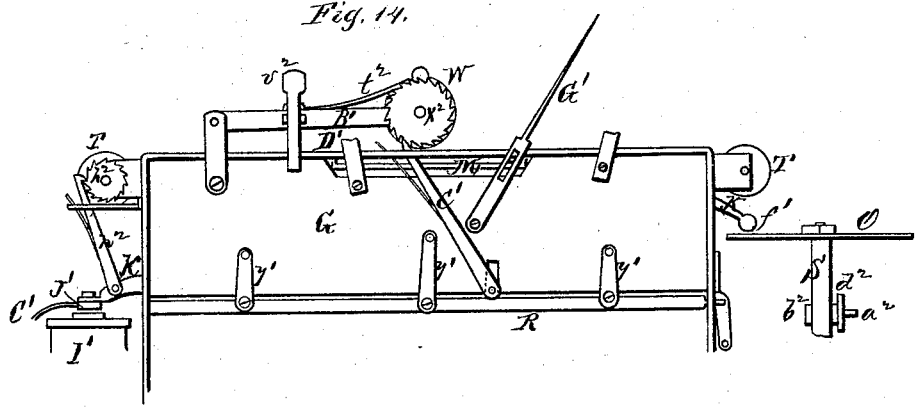

4 Sheets--Sheet 1.
G. W. HOWE.
Printing Telegraphs.
No. 150,953. Patented May 19, 1874.
*Fig. 1.*
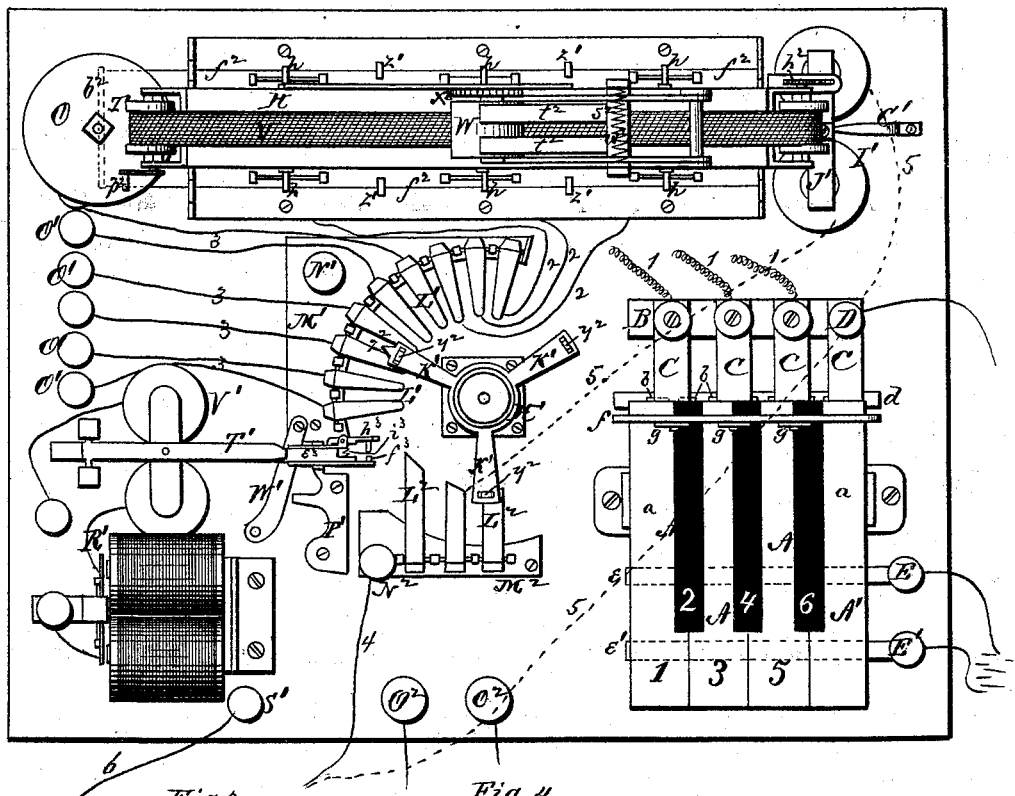
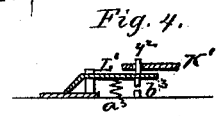
*Fig. 3.*   *Fig. 4.*
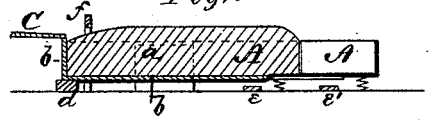
*Fig. 5.*
Witnesses.
Henry N. Miller
C. L. Ernst
Inventor.
George W. Howe
per
Attorneys.

4 Sheets--Sheet 2.
G. W. HOWE.
Printing Telegraphs.
No. 150,953. Patented May 19, 1874.
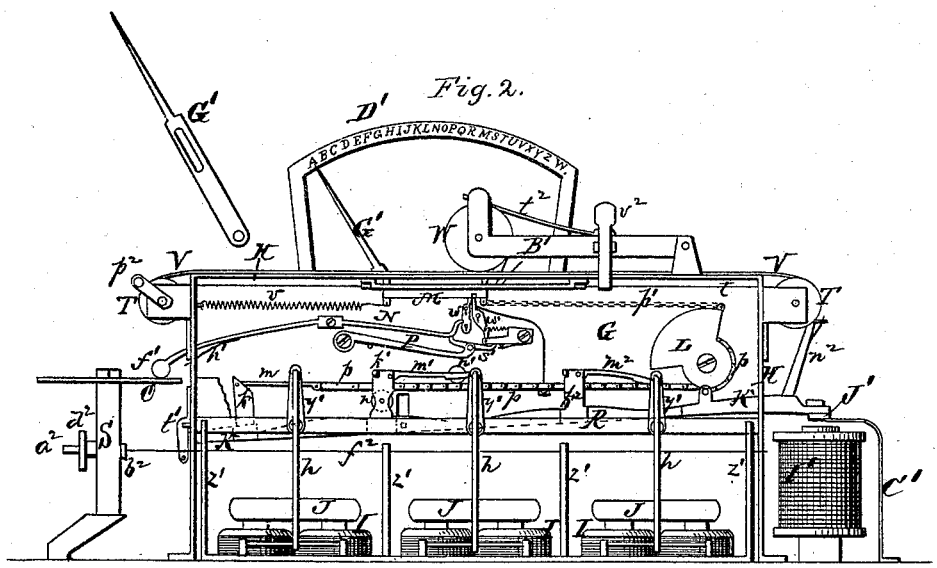
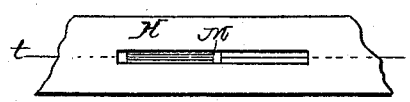
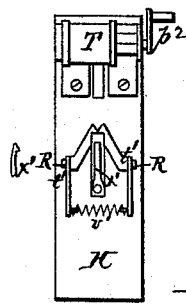
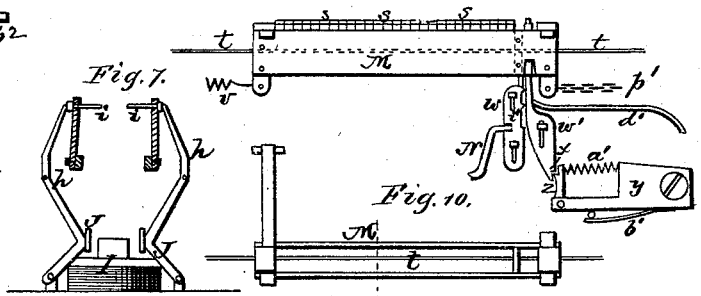
Witnesses.
Henry N. Miller
C. L. Ewert
Inventor.
George W. Howe,
per
Alexander Mason
Attorneys 4 Sheets--Sheet 3.

G. W. HOWE.
Printing Telegraphs.

No. 150,953. Patented May 19, 1874.

Witnesses.
Henry N. Miller
C. L. Evert

Inventor.
George W. Howe
per
Attorneys.

G. W. HOWE.
Printing Telegraphs.

No. 150,953.   Patented May 19, 1874.

4 Sheets--Sheet 4.

WITNESSES.
Henry N. Miller
C. L. Evert.

INVENTOR.
G. W. Howe
By Alexander Mather
Attorneys.

UNITED STATES PATENT OFFICE.

GEORGE W. HOWE, OF STEVENSON, ALABAMA.

IMPROVEMENT IN PRINTING-TELEGRAPHS.

Specification forming part of Letters Patent No. 150,953, dated May 19, 1874; application filed June 20, 1873.

*To all whom it may concern:*

Be it known that I, G. W. HOWE, of Stevenson, in the county of Jackson and in the State of Alabama, have invented certain new and useful Improvements in Telegraph - Instrument; and do hereby declare that the following is a full, clear, and exact description thereof, reference being had to the accompanying drawings and to the letters of reference marked thereon, making a part of this specification.

The object of my invention is to provide a printing-telegraph instrument which shall be simple and rapid, and also allow of two or more additional instruments of a like pattern to be attached through it to the same line, governed and controlled thereby, and each transmitting or receiving in regular order, one machine after the other, without conflicting with each other in any manner.

Printing - telegraphs heretofore invented have required a separate key, or its equivalent, for each letter or character to be transmitted, whereas in my invention only six keys are needed. From one to three currents are transmitted for each letter. By pressing down the keys separately single currents are transmitted, which cause six different letters to be printed. By combinations of two twelve more letters, and by combinations of three the remaining letters, are printed. I make use of to-and-fro positive and negative currents of electricity.

The accompanying drawings show the construction of a machine designed especially to allow two additional machines to be attached. The number of machines that may be used simultaneously depends materially on the length of the conductor to be worked. The essential principle of this system is to transmit, at regular and fixed intervals of time, from one to three currents or impulses of electricity for each letter, which on arriving at the distant instrument shall follow separate paths through different magnets controlling a series of six pins, which separately and by different combinations control the necessary mechanism for printing all the letters of the alphabet. A local circuit is brought into use automatically, which actuates the printing-mechanism, and after a letter is printed, causes the pin or pins to assume their natural position in readiness for another impulse.

The complete instrument consists of, first, key-board; second, printing-register; third, semicircular row of circuit-closing keys or levers, with revolving key-closer and automatic stop to arrest the same, and compel it to start in unison with the revolving key-closer at distant termini of the line. The additional instruments to be attached consist simply of the key-board and register.

Figure 15:
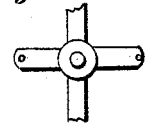
Figure 16:
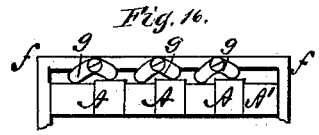
Figures 12, 13:
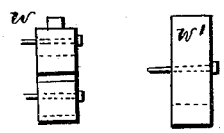
Figure 17:
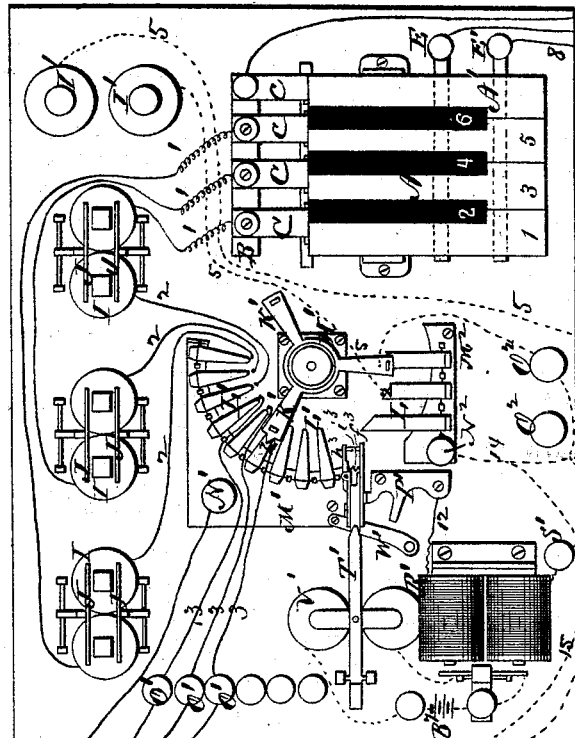
Figure 18:
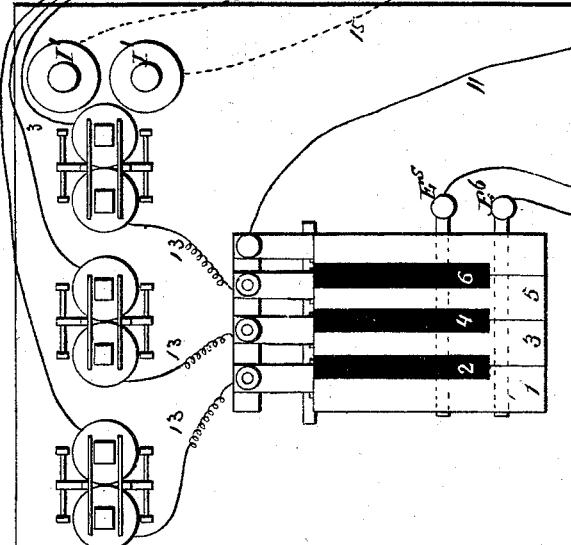

In the drawings, Figure 1 is a plan view of the entire instrument. Fig 2 is a front view of the same with the front plate of the printing-register removed. Fig. 3 is an enlarged side view of the stop. Fig. 4 is a longitudinal section through one of the circuit-closing keys. Fig. 5 is a longitudinal section through one of the keys of the key-board. Fig. 6 is an end view of the register. Fig. 7 is an end view of a pair of magnets with their armature-levers and pins. Fig. 8 is a plan view of the type-case. Fig. 9 is an enlarged view of the type-frame and levers actuating the type. Fig. 10 is a top view of the type-frame. Fig. 11 is a cross-section of the same and through one of the types. Fig. 12 is a side view of the lever used to press up the types. Fig. 13 is a side view of the lever used to press up the "period" type. Fig. 14 is a back view of the register. Fig. 15 is an end view of one set of arms used to withdraw the register-pins; and Fig. 16 is a view of the frame and arms above the key-board. Figs. 17 and 18 represent plan views of so much of a principal and one additional instrument as will show their connections and manner of working the same.

The key-board is of simple construction, consisting of four white and three black keys, which are held in place by a rod, $a$, passing through them near the center. The transmitting-keys are lettered A A, and numbered 1, 2, 3, 4, 5, and 6. The blank key A' is used simply to open or break ground-connection, when it is necessary to break the sending-operator. The keys are made of wood or other suitable non-conducting material, and the bottom of each of the numbered keys is faced with a strip, $b$, of metal of less width than the keys, and which is bent upward a little above the top of the keys at the rear end, as shown in Fig. 5. Behind the keys is a block, B, of wood or other non-conducting material, to which is fastened flat metal springs C C, the free ends of which rest on top of the metal ends $b\ b$ to the keys. These springs are wide, and each one holds down two of the keys, with the exception of the blank key, which is held down by a separate spring. The blank key A' has simply the back end faced with metal. The spring resting on the back end of this key has a binding-screw, D, in which the ground-wire must be inserted. Under the keys, and at right angles with them, there are three metal bars, $d\ e\ e^1$. The rear ends of the keys are pressed down against the back bar $d$. The front bars $e\ e^1$ have binding-screws E E$^1$, in which wires leading to the batteries are inserted. While at rest the keys are all to ground through the rear bar $d$, end facing the blank key A' and the metal spring resting on it. When the blank key is pressed down, the rear end is raised from the metal beam $d$, and the ground-connection of the transmitting-keys is broken. When one of the white transmitting-keys is pressed down the rear end is raised, thus breaking its ground-connection, and the front end rests on the metal cross-bar $e^1$ connected with the negative pole of a main battery. When a black key is pressed down its ground-connection is broken, and it rests on the bar $e$ connected with the positive pole of a main battery. Above the keys, near the rear end, and at right angles with the same, there is a square metal frame, $f$, having three short-curved arms, $g\ g$, attached thereto by screws through their center, as shown in Fig. 16. One end of each arm $g$ is situated directly over a white key, and the other end over a black key. These arms are used to prevent the keys over which they are placed from being pressed down simultaneously, which would short-circuit the main batteries. When one key is pressed down the other is held by the arm. The use of this key-board is to break ground-connection and establish connection through the register-magnets between the semicircular row of connecting-points under the circuit-closing levers and the main batteries.

The printing-register consists of two upright plates, G G, which are held a short distance apart by screws inserted through a wide strip, H, of metal, which passes over them lengthwise, and extends downward at each end of the plates, and is attached to the top of the instrument-case. Under these upright plates are three upright electro-magnets, I I, of the usual construction, with this exception: The cores are made square at the upper ends. These magnets are connected separately, by wires 1, to the three springs C C resting on the transmitting-keys, and also to the semicircular row of connecting-points, as before mentioned, by wires 2. These magnets each command two armatures, J J, placed in front and behind them. These armatures are steel, and permanently magnetized. Whenever a positive current passes through the magnets one set of armatures is attracted, and whenever a negative current passes the opposite set will be attracted. I do not, however, confine myself to this plan. Polarized magnets may be used, or each armature may have a separate magnet. From these armatures upright levers $h\ h$ extend, the tops of which are directly opposite the heads of pins $i\ i$ inserted loosely through the upright plates G. There are six pins $i$—three in each plate—the pins in one plate opposite those in the other, but in slightly different positions. The use of the magnets I is to strike these pins inward, and thus arrest a series of three arms in the register, as will be hereinafter described.

Between the upright plates G G, and extending beyond them at each end, is a long lever, K, having a bearing or fulcrum near the right-hand end of the plates. To the right-hand end of this lever is attached a soft-iron armature, J', which is controlled by an upright local magnet, I', situated directly underneath. A spring, C', presses the armature upward. Near the left end of the long lever K there is a short upright arm, $k$, having a slit in the top, in which is pivoted one end of a short horizontal arm, $m$. Near the center of the long lever K is another similar upright arm, $k^1$, which has a slit extending nearly to the bottom. Near the bottom of this slit is inserted and pivoted a small roller, $n$. Above this roller is pivoted one end of a horizontal arm, $m^1$, in the other end of which there is a vertical opening, in which is inserted and pivoted a small roller, $n^1$. Near the right end of the long lever is still another upright arm, $k^2$, shorter than the other, and having also a deep slit in the top, in which is pivoted one end of a horizontal arm, $m^2$, similar to the others. Directly above the fulcrum of this long lever K there is an eccentric-wheel, L, pivoted to the back plate of the register. To the short circumference of this wheel is attached one end of a chain, $p$, which passes under the horizontal arm $m^2$ through the slit in the upright arm $k^2$, under the roller $n^1$ in the horizontal arm $m^1$, through the slit above the roller $n$ in the upright arm $k^1$, and is attached to the movable end of the horizontal arm $m$. Whenever the lever K is raised by the local magnet I' under the outer end the arms and chain are raised with it, but the eccentric-wheel L is not turned unless one or more of the register-pins $i\ i$ are pushed in previously. In this case the arm or arms $m$ would be stopped by the pins and the chain shortened or taken up by the ends of the arms pressing it down, causing the eccentric to turn accordingly. The object of this is to move the type, as will be hereinafter described.

To perform the printing, narrow movable steel types are used. These types $s$ have shoulders or projections on each side near the top, and are set up in a row in a metal frame, M, their shoulders resting on the top edge of the same and their lower extremities even with the lower edge of the frame, as shown in Fig. 11. This frame is situated under the top plate of the register. Near the center there is a long narrow opening in the top plate, and the type project upward, and their faces are on a level with the top of the register. The type-frame has projections on each upper corner which rest on metal guides underneath, and thus allow it to be moved forward or backward. It has two compartments, as shown in Fig. 10, the right-hand one holding but one type, which represents the period. The type-frame is notched at its lower edges opposite this type, which allows a lever wider than the inside of the type-frame to press this type up.

The other compartment holds twenty-six type, representing the twenty-six letters of the alphabet. The $m$ and $w$ characters each occupy two-twenty-eighths of the long compartment of the type-frame. The other letters each occupy one-twenty-eighth of the same. With the exception of the letters $m$ and $w$, the characters may be arranged in any desired order. The $m$ should be placed as the seventeenth type, counting from the partition in the type-frame, and $w$ should be placed as the last type in the row, or it may be placed as the first. The $m$ type should occupy the position mentioned above, because the eighteenth twenty-eighth of the type-frame is never in position to be acted on by the lever controlling the type.

There is a square or oblong aperture through both ends of the type-frame, and also through the partition in the same. There are like openings through the types, which allow a fine wire, $t$, to be passed through the frame and type. This wire is fastened to each end of the register-frame, and drawn tight. This arrangement allows the type to be pressed up separately, and the wire acts as a spring, and pulls them back again to their natural positions. To the right end of the type-frame M, one end of a chain, $p^1$, is attached, the other end of which is fastened to the top of the eccentric-wheel L. Whenever this wheel is caused to turn, by the means before mentioned, the type-frame moves toward the right. A spiral spring, $v$, serves to draw it back to its position of rest. Under the type-frame are placed, side by side, two upright levers, $w$ and $w^1$, which are attached to the back plate of the register. The right-hand lever $w^1$ may be moved upward, and also partly turned on its support. The left-hand lever $w$ can only be moved upward. The lever $w^1$ has a notch, $x$, near its lower extremity. Pivoted to the back register-plate is a horizontal arm, $y$, from the movable end of which there extends upward a short catch, $z$, pivoted to the arm, and held in position by a small spiral spring, $a^1$. This catch fits into the notch $x$ in the lever $w^1$, and the arm $y$ to which it is pivoted is held in position by a straight spring, $b^1$, pressing against a peg. This right-hand lever $w^1$ is of slightly less thickness than the types, but is as wide as the type-frame, and can only be pressed upward when the notches in the type-frame are above it. It can be used to press up the period type, and none other. Through the lever $w^1$, sidewise, there is an opening, and a spring, $d^1$, having a small catch-shaped end, is bent upward and inward, and the point projects through the above opening. This spring presses the lever $w^1$ sidewise and downward. From the opposite lever $w$, just above this opening there is a small chisel-shaped projection, $i^1$, as shown in Fig. 9. A long crooked lever, N, one end of which fits into a square notch in the upright lever $w$, extends downward and outward beyond the register. The outer end of this lever has a ball, $f^1$, which is designed to strike on a circular sounding-plate, O, under it every time the upright lever is pressed upward. The lever N is pivoted to the back plate of the register through its center, and a small spring, $h^1$, holds it in position, and with it the upright lever $w$. This upright lever $w$ at the top, is of slightly less thickness than the types. It is made narrow enough to allow it to be pressed upward between the sides of the type-frame, and thus press upward the different types in the long division of the type-frame. The top of this lever rests on the partition in the type-frame when the same is at rest. The levers $w$ $w^1$ are shown in side views in Figs. 12 and 13, respectively.

Under the two upright levers $w$ $w^1$ there is a horizontal arm, P, one end of which is pivoted to the back plate of the register, while the movable end is bent upward and pivoted thereto. Through its center there is a curved rocking piece, S'. Now, whenever the long lever K worked by the printing-magnet I' is raised, the arm P supporting the rocking piece S' will be struck upward by the center upright post $k^1$ of the long lever K, and one of the upright levers $w$ $w^1$ above the rocking piece is pressed upward. If the type-frame is in its position of rest, the right-hand upright lever $w^1$ will be raised. The left-hand lever $w$, resting in the division in the type-frame, acts as a fulcrum for the other. The point of the spring $d^1$, passing through the upright lever $w^1$, will rest on the projection $i^1$ on the opposite upright lever $w$. When the long printing-magnet lever K falls back to place the upright lever $w^1$ remains held by the spring resting on the projection, the catch $z$ in the horizontal arm $y$ falls below the bottom of the lever, and if the printing-magnet lever is again raised while the type-frame remains in its position of rest, the upright lever will press the period-type up against the paper, and a dot will be printed. When the type-frame is moved the lever $w^1$ is pressed away by the notches in the type-frame, and the spring instantly causes it to drop down to its place of rest. When the type-frame is moved from its position of rest, the right-hand upright lever $w^1$ acts as fulcrum for the rocking piece $s^1$, and the left-hand lever $w$ may be pressed upward, and the type above it at the time will be pressed up, and the impression of the same made on the paper strip above. Below the side plates G of the register there are two narrow bars, R, the right-hand ends of which fit loosely into holes through the register-frame. The other extremities pass through holes in the other end of the register-frame, and short curved or angular pieces $t^1 t^1$ are attached at their centers rigidly to these extremities of the bars. A spiral spring, $v^1$, is placed between the pieces $t^1$, below the center, which causes the upper ends to press together. These ends have projections similar to the teeth of a saw, as shown in Fig. 6, and the points thereof touch each other. The lower edges are straight, while the upper edges slope upward from the points. To the left end of the long register-lever K is rigidly attached one end of an upright catch-spring, $x^1$. On being pressed upward this catch is pressed outward by the straight edges of the teeth on the pieces $t^1$, and they are not moved, but, on being drawn back by the lowering of the long register-lever K, the catch fits in between the sloping upper edges of the teeth and causes them to separate slightly, and thus partly turning the bars R R, to which they are attached. From each of these bars there extend upward three straight arms, $y^1 y^1$, having holes through their upper ends. The six register-pins $i\ i$ above mentioned pass through these holes, which are too small to allow the heads to pass through. If any of these pins are pressed in by the magnets I I controlling them they will be withdrawn again by the upright arms $y^1$, through which they pass, whenever the bar to which they are attached is caused to slightly rotate by the means above described. Attached to the top of the instrument-case, on each side of the register, there are four upright arms, $z^1 z^1$, having small holes through them near their upper ends, and there are small corresponding holes through each of the upright armature-levers $h$. Beyond the left end of the register there is an upright post, S, which supports the circular sounding-plate O. Passing loosely through an aperture midway of the post S there is a screw-rod, $a^2$, to one end of which is rigidly attached a straight cross-arm, $b^2$, having small holes through each end. On the other end of the screw-rod $a^2$ there is a movable nut, $d^2$. A fine wire or thread, $f^2$, is passed through the small holes in the cross-arm $b^2$, upright arms $z^1$, and armature-levers $h$, and the ends tied together. By turning the nut on the screw-rod the fine wire or thread may be tightened or slackened, as desired, and all the armatures thereby simultaneously adjusted. At each end of the register there is a spool, T, which fits tightly on square axles, but may be moved lengthwise when desired. The spool-axles turn in bearings attached to the register, and are connected by an inking-ribbon, V, which passes over the top of the register. On the axle of the right-hand spool there is a ratchet-wheel, $h^2$, which is worked by an upright catch-lever, $n^2$, the lower end of which is pivoted to the local printing armature-lever K. When the armature vibrates this catch turns the ratchet-wheel, and thus moves the inking-ribbon. On the axle of the other spool there is a crank, $p^2$, which may be turned to rewind the ribbon after it has been wound off onto the spool worked by the ratchet. On top of the register there is a paper-roller, W, with pivots at each end passing through a frame, $B^1$. This frame is pivoted at the right-hand end to short upright arms attached to the register-frame. In the frame $B^1$ is a cross-piece, $s^2$, to which are attached two flat springs, $t^2$, the free ends of which press on the top of the paper-roller W. In the outer ends of the cross-piece $s^2$ are pivoted, through their centers, two upright arms, $v^2 v^2$, in each of which there are two notches at their lower ends to fit over the top rim of the register. When the paper-roller is raised, to prevent an impression being made on the paper strip, the lower notches fit over the rim to the register, and thus hold the roller and frame up. When it is lowered the top notches fit over the rim and hold the roller and frame firmly in a position for the types to be pressed against the roller. The upper ends of the arms $v^2$ are pressed apart by a spiral spring, $w^2$, placed between them. They may be pressed inward by the fingers, and the paper-roller and frame raised or lowered at pleasure. The paper strip to be printed on passes under and over the roller, and under the springs resting on the same. When the roller is revolved the paper is moved along by friction between the roller and springs above. An upright ratchet-arm, C', the lower end of which is pivoted to the long register-lever K, fits into the teeth of a ratchet-wheel, $x^2$, on one end of the paper-roller, and thus moves the paper strip along when the ratchet is worked. There is a curved index-piece, D', raised above the register from the back side, on which the letters of the alphabet are marked in proper order, corresponding with the type in the type-frame. A slim pointer, G', the lower end pivoted to the back of the register, has a slit near its center, as shown in Figs. 2 and 14. One of the projections from the corner of the type-frame enters this slit, and compels the pointer-arm to move with it, and thus point toward the different letters marked on the index above as they are printed or transmitted. Communication may be read, if desired, by simply noticing what letters the point stops at. The sending operator may also watch the pointer to see that he transmits correctly.

It now remains to describe the revolving key-closer, &c.

A vertical shaft extends upward from the inside of the instrument-case, and passes through a circular plate, H', above the top of the case. This plate has three or more arms, K' K', extending radially outward at equal distances apart, and is confined between a projecting rim or shoulder on the shaft and washer and screw-nut above.

A steady uniform motion is given to the shaft by a train of wheels inside the case, driven by a spring, and regulated by a "Hughes' spring-governor." Any reliable, steady motive power, however, may be used to turn the shaft. When the shaft revolves, the three arms K' revolve with it; but as they are held by friction, as before noticed, they may be arrested without affecting the revolution of the shaft. Near the outer end of each arm there is an oblong opening at right angles with the same, in which is pivoted a small wheel or roller, $y^2$. The rollers or wheels $y^2$ should be made of non-conducting substance, to prevent any mixing of the main line and local currents. One of the arms has a tooth-shaped projection, $z^2$, at the outer end, the object of which will be hereinafter set forth. The revolving arms K' are used to press down two separate series of short circuit-closing levers, $L^1 L^1$ and $L^2 L^2$, the inner extremities of which are in the circle passed over by the small wheels $y^2$, which wheels are used simply to lessen friction between the arms and circuit-levers. The outer extremities of the levers $L^1 L^2$ are pivoted to short standards extending upward from two plates, $M^1 M^2$, of metal, attached to the top of the case. There are nine levers in the series $L^1$, and three in the series $L^2$. When more than two extra machines are to be attached to the line, more levers must be added—four for every additional machine, in proportion of three to one for each series. These levers are held up by small spiral springs $a^3$. Under the movable end of each lever is an anvil or connecting-point, $b^3$, as shown in Fig. 4. There is a binding-screw, $N^1$, at one corner of the plate $M^1$, supporting the nine circuit-closing levers $L^1$, into which the main line should be inserted. The anvils or connecting-points $b^3$, under this series of levers, are connected as follows: The three first are connected, by wires 2 2, separately to the magnets I I in the register, which magnets are as before mentioned, by wires 1 1, connected to the three wide springs C C resting on the key-board keys A A.

It is evident, therefore, that every time one of the above levers is pressed down by a revolving arm, the main line is put in connection with the ground through the key-board, and a current of electricity might be received from the other end of the line. On the other hand, if the proper key to the key-board were down, the main line would be in connection with the positive or negative pole of a main battery, according to the color of the key, and a current would be transmitted through the line and distant machine; and, provided the same circuit-closing lever were down, then the signal would follow the same path through both machines, and the corresponding register-pins would be pushed in.

The remaining six connecting-points of the levers $L^1$ are connected by wires 3 3, to six binding-screws, $O^1$, on the left end of the instrument-case. Two additional machines may be worked by inserting wires in these binding-screws, and extending and connecting the wires separately through their register-magnets to the key-board. The smaller series of three connecting-levers, $L^2$, is used to close the local or printing circuit. The plate $M^2$, to which they are pivoted, has a binding-screw, $N^2$, in which a wire, 4, leading to one pole of a local battery is inserted. The center one of the connecting-points is, by a wire, 5, connected with the other pole of this battery through the printing-magnet I' of the register. The other two points are connected to binding-screws $O^2 O^2$, in which wires may be inserted, and extended separately through the printing-magnets to the two additional machines.

It will be seen that, as the revolving arms K' press these levers down, the printing-circuits are closed through the respective machines automatically, in regular order, one after the other. Whether a letter will be printed or not depends on the position of the type-frame.

Between the two series of connecting-levers there is a metal plate, P', which is connected, through a relay-magnet, R', to a binding-screw, S'. A wire, 6, from one pole of the main battery should be inserted in this binding-screw. In the space between the two plates P' and $M^1$ there is a stop, which is pivoted to them, the ends of the plates being bent upward for this purpose. This stop is composed of two narrow side plates, $d^3$, separated by a block, $e^3$, of non-conducting material. Inserted in the inner end of one of the side plates $d^3$ there is a contact-point, $f^3$, and to the other side plate is pivoted a short circuit-closing lever, $h^3$, having a contact-point opposite the one in the other side plate. Contact of these points is prevented by a small spiral spring, $i^3$. The end of the short pivoted lever $h^3$ is, in the circle, passed over by the tooth-shaped projection $z^2$ on one of the revolving arms K'. When this tooth reaches the lever $h^3$ it presses it forward, and thus closes the connecting-points, but is itself arrested and held until the stop is moved from its path. This is accomplished by the end of a lever, T', worked by a local magnet, V'. This lever rests on the outer end of the stop, and, when it is moved by a current through its magnet, it depresses this end, and thus raises the inner end and allows the arms to make another complete revolution to be again arrested and released, as before. The releasing-magnet V' is controlled by the relay-magnet R'. The stop is held in its proper position by a small spring, $k^3$, under the outer end, as shown in Fig. 3. The object of the revolving arms is to close the series of main-line circuit-closing levers, and thus switch or connect the main line through each of the register-magnets to the different machines, and also to close the series of local circuit-closing levers to each machine at regular and proper intervals. The shaft carrying the arms should revolve at a uniform speed. Each revolution allows the machines to print three letters each.

It will be noticed that directly after three of the main-line levers have been pressed down by one of the arms, one of the local levers is pressed down by the arm ahead of it, and the same operation is continually repeated. This allows of the proper currents being first transmitted to strike in the register-pins for the letter required before the printing-circuit is closed to perform the impression.

The plates to which the stop is pivoted may be connected directly together by a switch, W', one end of which is pivoted to one of the plates, and the other end is movable. When the plates are connected by this switch the stop is out of the circuit and inoperative. This is the proper position when the machines are at rest. The main line at each end is thus put to battery, one terminus to a positive pole and the other to a negative.

The operator wishing to transmit gives a signal to the distant operator by moving the switch off and on a few times, and thus breaking and closing circuit through the relay-magnets controlling the local stop-magnet. A Morse key may be inserted for this purpose, if preferred. The distant operator answers in the same manner. Both operators then open the switch and start the machinery which turns the revolving arms. The line is thus closed every time the tooth on the revolving arm at each instrument closes the circuit-closer on the stop. A current from each terminus is thereby automatically transmitted through the relays that control the stop-magnets. The stops are instantly depressed and the arms both start together to be again arrested and released at each revolution. As the arms are thus caused to revolve synchronously, the same circuit-closing levers at each terminus will be closed at the same time; but there can be no battery-connection and no current passes unless the corresponding key-board key at one of the machines is down. The keys of the different machines may now be pressed down and the proper currents to strike in different register-pins transmitted to produce any letter required. As soon as a revolving arm has passed three circuit-levers the local printing-circuit is automatically closed by the next forward arm. This raises the long printing-lever having the arms and chain. If all the register-pins are in their positions of rest there is nothing to arrest the arms resting on the chain, and the type-frame is not moved; but the type representing the period is pressed up slightly by the lever underneath it. If the type-frame is allowed to remain at rest while the printing-circuit is again closed the period type will be pressed up still farther and print a dot on the paper strip above. A dot will be printed automatically every time the type-frame is allowed to remain at rest, while the printing-circuit is closed twice consecutively; but if any of the register-pins are struck in previously the horizontal arm on the printing-lever will be arrested thereby whenever the printing-lever is raised, and the chain under them will be shortened or taken up. This causes the eccentric wheel to move, and, by means of the chain above, moves the type-frame. As the pins are placed in different positions in the register-plates, each cause a corresponding movement of the type-frame, and it may be moved thereby to bring every letter directly over the upright lever used to press them up against the paper strip. The different pins move the type-frame as follows: one, two, three, six, nine, and nineteen twenty-eighths, respectively. The printing is accomplished by the long printing-lever striking upward the left-hand upright lever $w$ underneath every time the local circuit is closed. Every time a letter is printed the sounding-plate is struck by the ball of the lever above it. The operator then instantly presses down the proper keys to command the pin or pins for another letter.

It will be noticed that the revolving arms, one after another, first close the three circuit-levers connected to its own key-board; next closes three connected to one additional machine, and next three to another. Therefore each machine can transmit or receive when its proper turn arrives.

The currents transmitted to strike in the register-pins being of short duration, and simply from one battery, are not sufficient to close the relay which controls the stop-magnet. Therefore it can only be closed when the stop-circuit at both ends is closed.

In Figs. 17 and 18 I have shown the arrangements or circuits at one terminus of the line, with two instruments attached. The main-line circuits in these figures are shown by full lines, and the local circuits by dotted or broken lines. The instruments at each end of the line are arranged alike, with this exception: The binding-screw S' of the relay R' is connected at one terminus to the positive pole of one of the main batteries, and at the other terminus to the negative pole of a main battery, so that one battery at each end of the line will come into play automatically whenever the stop circuit-closer at both machines is closed. Two main batteries, $B^5 B^6$, are used to transmit the currents necessary to strike in the register-pins, one having its positive and the other its negative pole facing the same poles of the distant batteries. The battery $B^5$ is connected by a wire, 6, to the key-board of the principal instrument at E; also, by a wire, 7, to the screw-cup S' of the relay-magnet R'. This wire also extends to and connects with the key-board of the additional instrument at the screw-cup $E^5$. The battery $B^6$ is connected by a wire, 8, to the key-board of the principal instrument at $E^1$, and also by wire 9 to the key-board of the additional instrument at $E^6$. The key-boards of each instrument have an earth connection by wires 10 and 11. The main line from the distant station enters the instrument at $N^1$. The plate P' is connected by a wire, 12, to the relay-magnet R', and this magnet controls the local magnet V', which is worked by local battery B⁷. We will suppose the revolving arms K' at each station to be revolving in the direction of the arrow. Now, whenever the arm having the pointed end comes in contact with the stop $e^3$, it presses the circuit-closing points together. If the corresponding circuit-closing points at the other station are pressed together at the same time, the main line is closed through the stop $e^3$ and relay-magnet R' at each station, and a current from one of the main batteries at each station will be automatically transmitted, which closes the relay-magnet R' at each terminus of the line, and thereby brings into action the local battery B⁷ and magnet V'. The lever of the magnet V' resting on the back end of the stop, the back end of the stop is instantly depressed, and the front end raised, which releases the revolving arms and opens the main circuit. The arms, making another revolution, are again arrested and released as before, and the same operation is constantly repeated so long as the arms are allowed to revolve. By this means the revolving arms are kept in unison at each end of the line. The instruments are used to receive or transmit without any change of parts. The wide springs C C, resting on the keys of the key-board in the principal instrument, Fig. 17, are connected by wires 1 1, separately, through the register-magnets I I, and by wires 2 2, to the three first of the circuit-closing levers L¹. The wide springs resting on the keys of the key-board in the additional instrument, Fig. 18, are connected by wires 13 and 3, separately, through their register-magnets to the anvils under the next three of the circuit-closing levers L¹. When the revolving arms are moving in unison at both ends of the line, and none of the key-board keys are pressed down, the line at each end is put to earth through wires 10 and 11 every time the revolving arms press down one of the circuit-closing levers L¹. When, however, a key of any instrument is pressed down by the finger the rear end is raised, the earth-connection to this key broken, and the front end rests on one of the bars connected to the main battery. When the revolving arms press down the circuit-closing lever connected to this key a short current of electricity will be transmitted through the corresponding register-magnet at the home and distant instrument. The principal instrument, Fig. 17, has control of the line during the time any revolving arm is passing those circuit-closing levers which are connected with its magnets I, and the additional instrument, Fig. 18, has control of the line during the time any arm is passing the circuit-closing levers which are connected with its magnets. Thus each can transmit or receive signals when their turn comes, and thus strike in any or all of the register-pins, as may be desired.

The local automatic printing-circuits may be traced as follows: The metal plate M² is connected by a wire, 14, to one pole of a local battery, B⁸. The other pole of this battery is connected by a wire, 5, through the local magnet I', to the anvil under one of the circuit-closing levers L². Whenever this lever is pressed down by the revolving arms this circuit is closed, and the magnet I' moves the long register-lever of this instrument, which performs the printing. The metal plate M² is also connected by wire 14 and 15, through the local magnet I' of the additional instrument, Fig. 18, and local battery B⁹, to one of the screw-cups O² of the principal instrument, Fig. 17, which screw-cup is connected to the anvil of another of the circuit-closing levers, L². Whenever this lever is pressed down by the revolving arms this local circuit is closed, and the magnet I' of the additional instrument, Fig. 18, responds and moves the long register-lever of that instrument, which performs the printing in the same. The remaining screw-cups O² and O¹ allow another instrument to be attached in the same manner as in Fig. 18.

Having thus fully described my invention, what I claim as new, and desire to secure by Letters Patent, is—

1. In a printing-telegraph instrument, a mechanism for transmitting at regular and fixed intervals of time from one to three currents or waves of electricity, which shall enter the main line separately through separate magnets controlling a series of pins, and upon arriving at the distant instrument follow corresponding paths through magnets controlling an equal number of pins, substantially as herein set forth.

2. The key-board, constructed substantially as described, in combination with the register-magnets I, revolving arms K', and circuit keys or levers L¹, or their equivalents, as and for the purposes set forth.

3. The frame $f$ above the key-board, with the pieces $g$, or their equivalents, pivoted, substantially as and for the purposes herein set forth.

4. The magnets I, in combination with the series of pins $i$, or their equivalents, substantially as set forth.

5. The series of register-pins $i$ $i$, or their equivalents, for the purposes herein set forth.

6. The long register-lever K, armature J', uprights $k$ $k^1$ $k^2$, arms $m$ $m^1$ $m^2$, rollers $n$ $n^1$, chains $p$ $p^1$, eccentric-wheel L, type-frame M, and spring $v$, or their equivalents, operating substantially as and for the purposes herein set forth.

7. The printing-magnet I', in combination with the revolving key-closer and local circuit-closing key or lever L², or their equivalents, as and for the purposes herein set forth.

8. The upright lever $w^1$, spring $d^1$, horizontal arm $y$, spring $a'$, and catch $z$, or their equivalents, as and for the purposes set forth.

9. The upright lever $w$, horizontal lever N, and sounding-plate O, or their equivalents, as and for the purposes herein set forth.

10. The horizontal arm P and the curved rocking piece $s^1$ pivoted thereto, or their equivalents, as and for the purposes herein set forth.

11. In a printing-telegraph instrument, separate and independent type, movable up and down in a frame or holder, for the purposes herein set forth.

12. The movable type-frame M, constructed and operating substantially as and for the purposes herein set forth.

13. The wire $t$, or its equivalent, in combination with the type and type-frame, substantially as and for the purposes herein set forth.

14. The index D' and pointer G', in combination with the type-frame, as and for the purposes set forth.

15. The crank $p^2$ on the axle of the spool T, for the purposes herein set forth.

16. The notched arms $v^2$ pivoted to the paper-roller frame $B^1$, and the spring $w^2$ pressing between them, substantially as and for the purposes set forth.

17. The upright arms $z^1$, cross-arm $b^2$, screw-rod $a^2$, nut $d^2$, and adjusting wire or thread $f^2$, or equivalents, as and for the purposes set forth.

18. The long horizontal rods R R, upright arms $y^1$, curved or angular pieces $t^1$, spring $v^1$, and catch $x^1$ on the long printing-lever K, substantially as and for the purposes herein set forth.

19. The arms K' K' confined by friction on the shaft and provided with wheels or rollers $y^2$, and one of them provided with a tooth or projection, $z^2$, as and for the purposes herein set forth.

20. The revolving arms K', in combination with circuit-closing keys L and $L^1$, or their equivalents, as and for the purposes herein set forth.

21. The main line circuit-closing levers L, or equivalents, in combination with the revolving-arms, register and key-board, as and for the purposes set forth.

22. The stop $d^3$ $e^3$, relay-magnet R', and local magnet V', in combination with the revolving key-closer, as and for the purposes set forth.

23. Additional instruments connected to a telegraph-line in the manner specified, in combination with the revolving key-closer, to close the circuit through the same, substantially as specified.

In testimony that I claim the foregoing I have hereunto set my hand this 27th day of May, 1873.

GEORGE W. HOWE.

Witnesses:
　D. E. B. HOWE,
　THOS. D. OSBORNE.